(12) United States Patent
Finkle et al.

(10) Patent No.: US 8,288,908 B2
(45) Date of Patent: Oct. 16, 2012

(54) RECONFIGURABLE INDUCTIVE TO SYNCHRONOUS MOTOR

(76) Inventors: Louis J. Finkle, Lakewood, CA (US); Andrea Furia, Downey, CA (US)

( * ) Notice: Subject to any disclaimer, the term of this patent is extended or adjusted under 35 U.S.C. 154(b) by 7 days.

(21) Appl. No.: 12/905,906

(22) Filed: Oct. 15, 2010

(65) Prior Publication Data

US 2011/0101814 A1    May 5, 2011

Related U.S. Application Data

(63) Continuation-in-part of application No. 12/610,184, filed on Oct. 30, 2009, and a continuation-in-part of application No. 12/610,271, filed on Oct. 30, 2009, now Pat. No. 8,097,993.

(51) Int. Cl.
*H02K 1/27* (2006.01)
*H02K 21/14* (2006.01)

(52) U.S. Cl. ......... 310/156.24; 310/156.36; 310/156.38; 310/156.43; 310/156.48; 310/191

(58) Field of Classification Search ............. 310/156.24, 310/156.36, 156.38, 156.43, 156.48, 191; 318/538, 540
See application file for complete search history.

(56) References Cited

U.S. PATENT DOCUMENTS

| | | |
|---|---|---|
| 2,209,558 A | 7/1940 | Bing et al. |
| 2,243,616 A | 5/1941 | Bing et al. |
| 2,287,286 A | 6/1942 | Bing et al. |
| 2,558,540 A | 6/1951 | Clos |
| 4,151,431 A | 4/1979 | Johnson |
| 4,508,998 A | 4/1985 | Hahn |
| 5,508,576 A | 4/1996 | Nagate et al. |
| 5,594,289 A | 1/1997 | Minato |
| 2004/0041481 A1 | 3/2004 | Kuo |
| 2006/0038457 A1 | 2/2006 | Miyata et al. |
| 2007/0228856 A1 | 10/2007 | Bates et al. |

FOREIGN PATENT DOCUMENTS

| | | |
|---|---|---|
| JP | 62-117558 | 11/1988 |
| JP | 09065591 A * | 3/1997 |
| JP | 2003-088071 A | 3/2003 |
| JP | 2005-210826 A | 8/2005 |
| JP | 2006-254638 A | 9/2006 |
| KR | 10-2005-011667 A | 12/2005 |
| WO | WO 88/05976 | 8/1988 |

OTHER PUBLICATIONS

Machine translation of JP 09065591 A, Apr. 2012.*

* cited by examiner

*Primary Examiner* — Quyen Leung
*Assistant Examiner* — David Scheuermann
(74) *Attorney, Agent, or Firm* — Kenneth L. Green

(57) ABSTRACT

A reconfigurable electric motor includes a rotor containing rotatable permanent magnets or non-magnetically conducting shunting pieces. The magnets and/or shunting pieces have a first position producing a weak magnetic field for asynchronous induction motor operation at startup and a second position producing a strong magnetic field for efficient synchronous operation. The motor includes a squirrel cage for induction motor operation at startup with the permanent magnets and/or shunting pieces positioned to product the weak magnetic field to not interfere with the startup. When the motor approaches or reaches synchronous RPM, the permanent magnets and/or shunting pieces rotate to produce a strong magnetic field for high efficiency synchronous operation. The position of the magnets and/or shunting pieces may be controlled by a centrifugal mechanism, or viscous damping may delay rotation of the magnets and/or shunting pieces, or electrically controlled apparatus may control positions of the magnets and/or shunting piece.

21 Claims, 13 Drawing Sheets

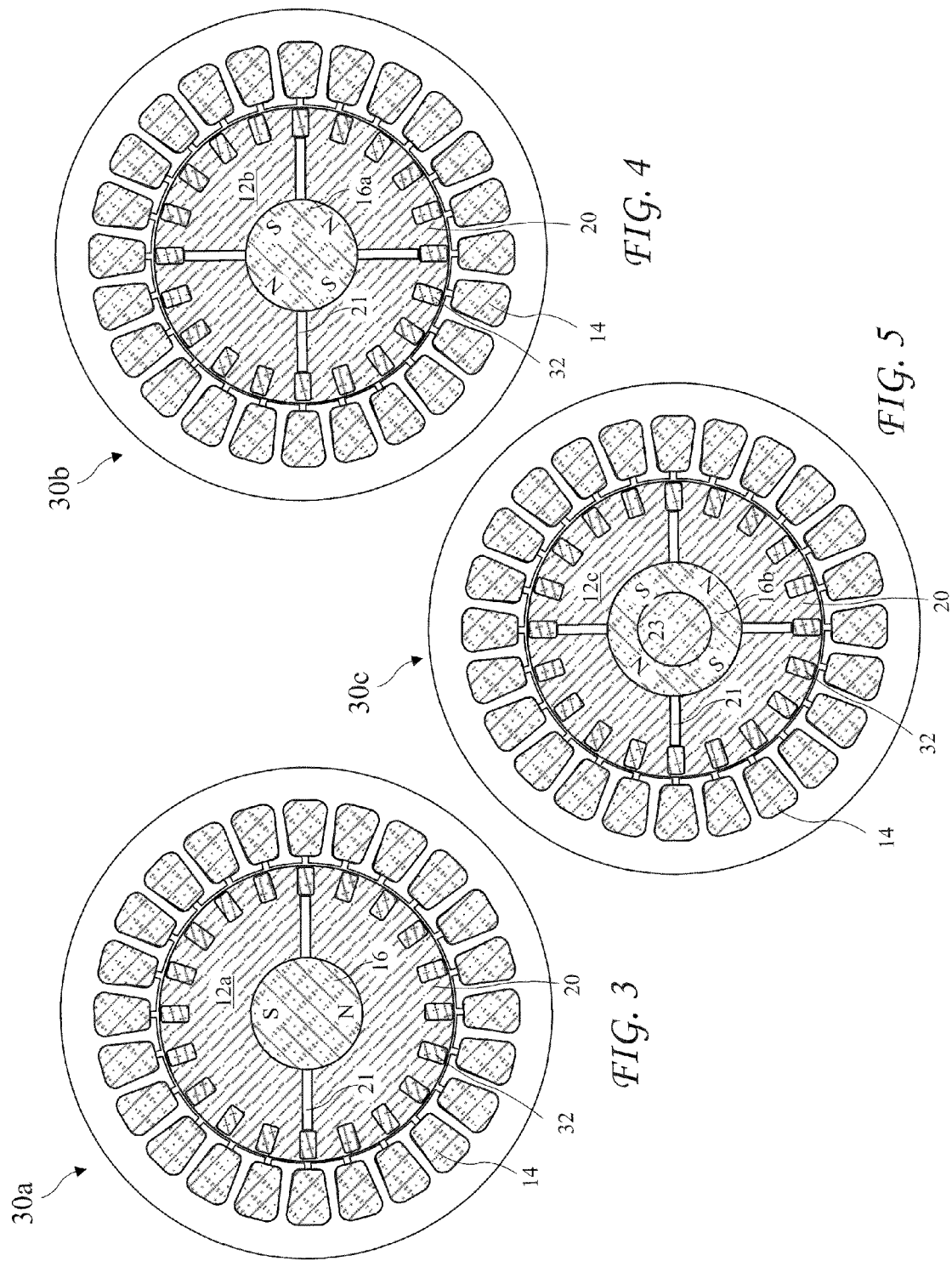

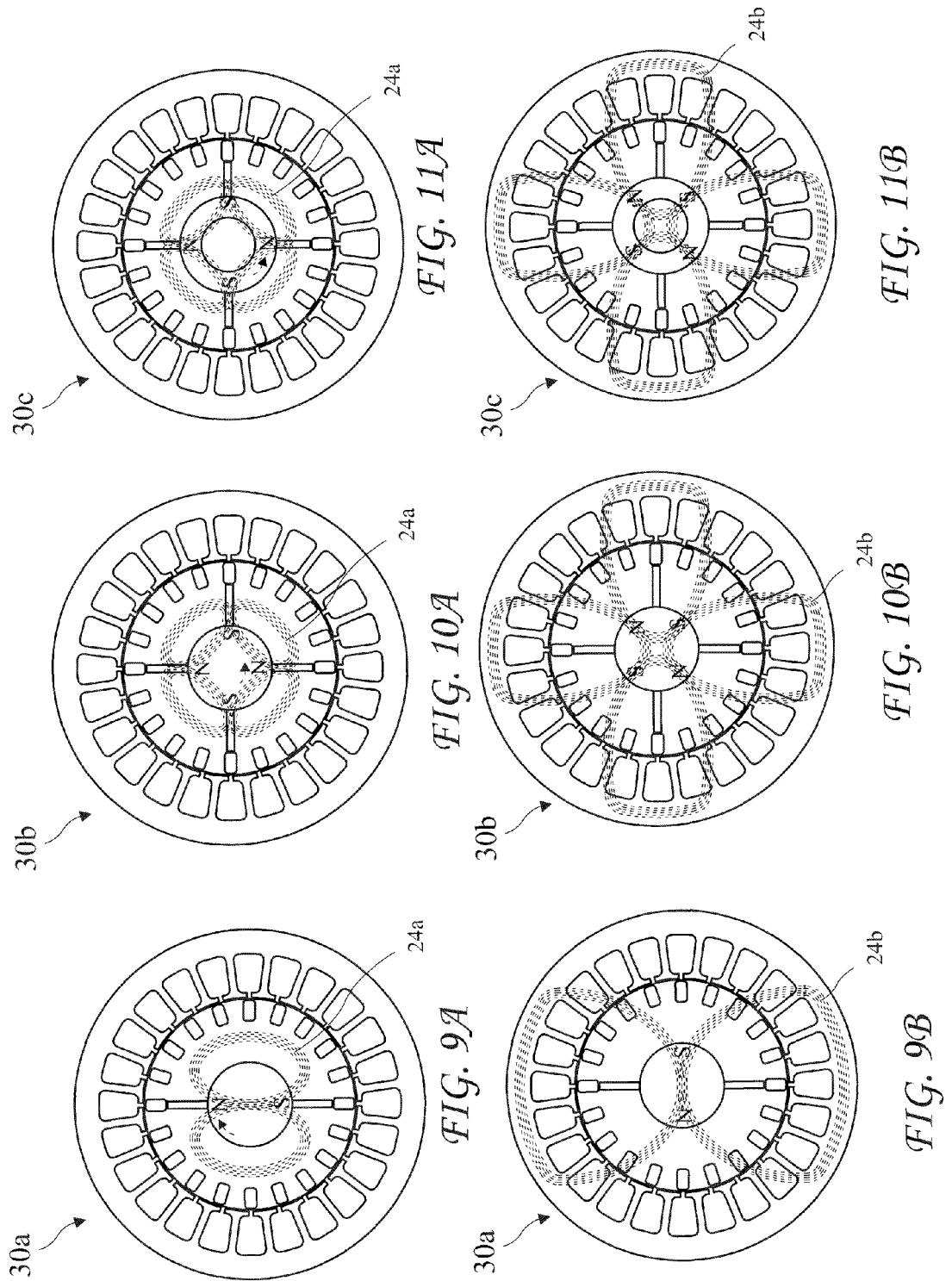

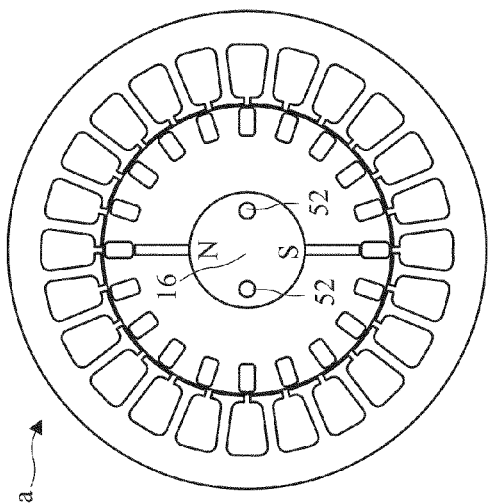
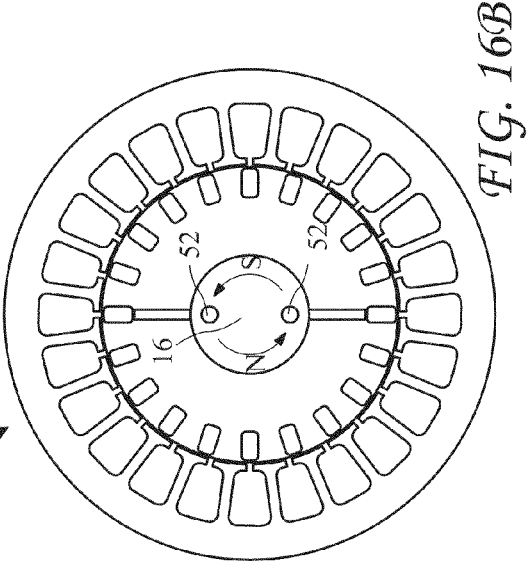
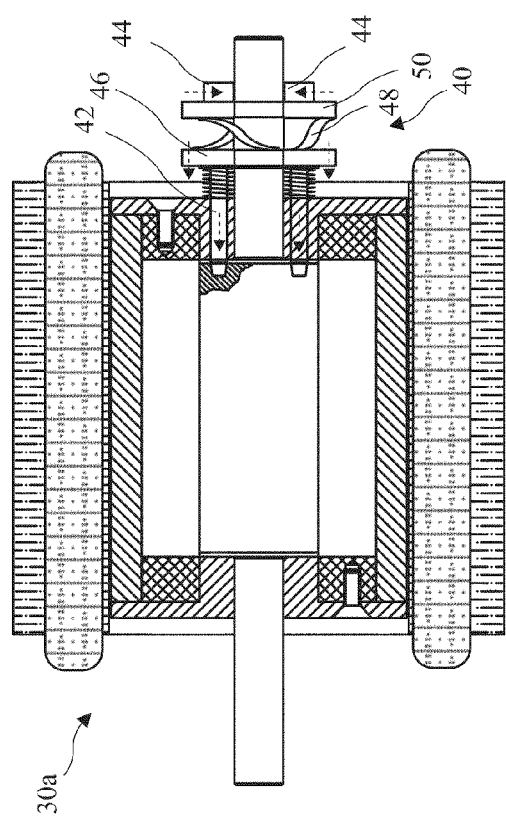
FIG. 15A
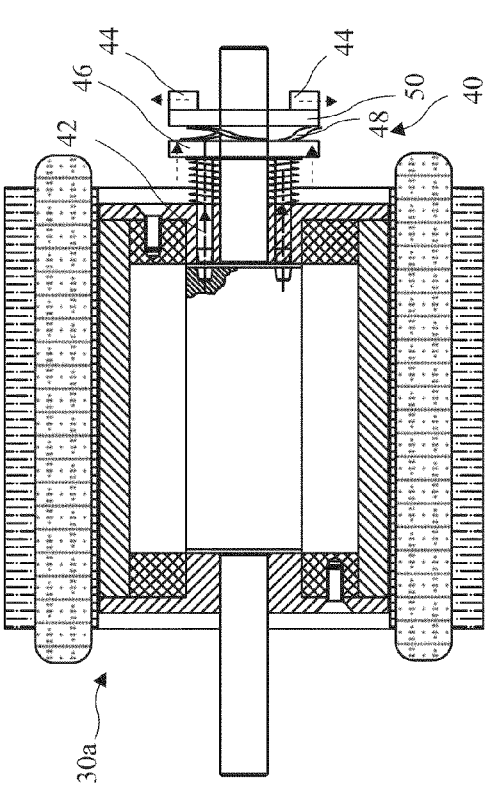
FIG. 16A

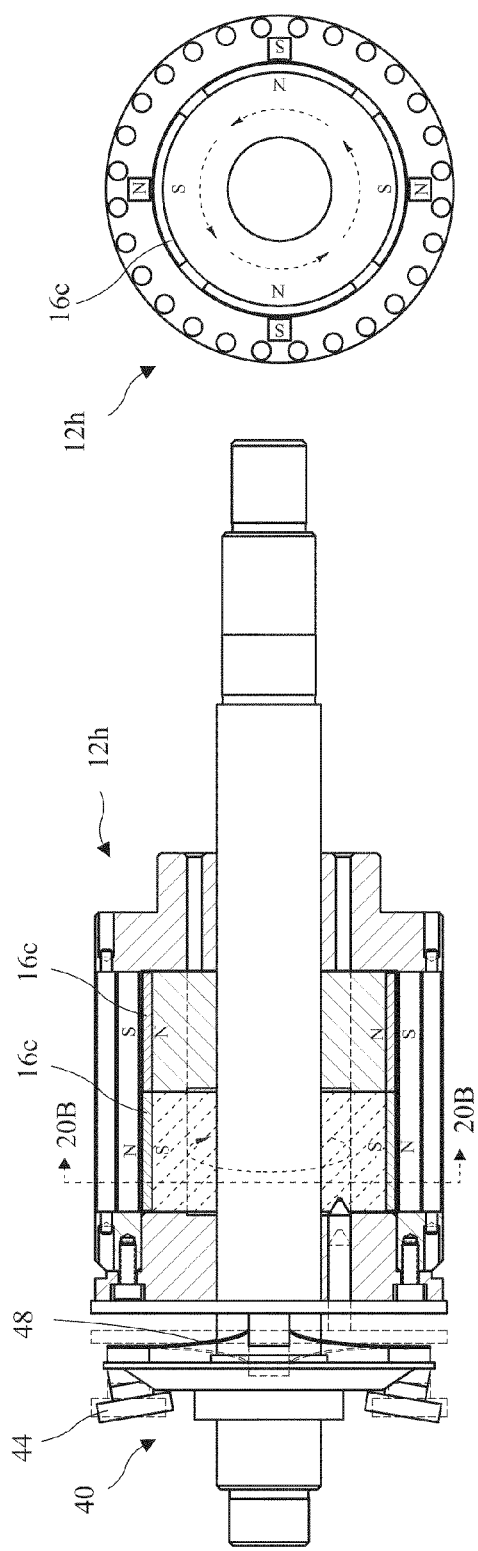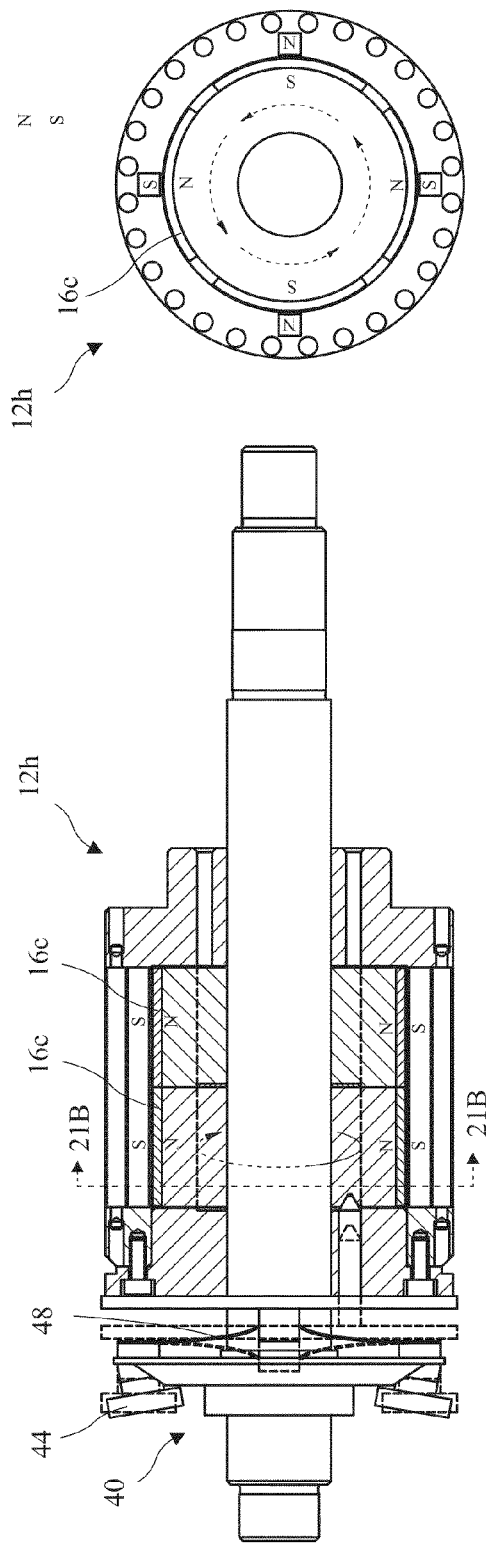

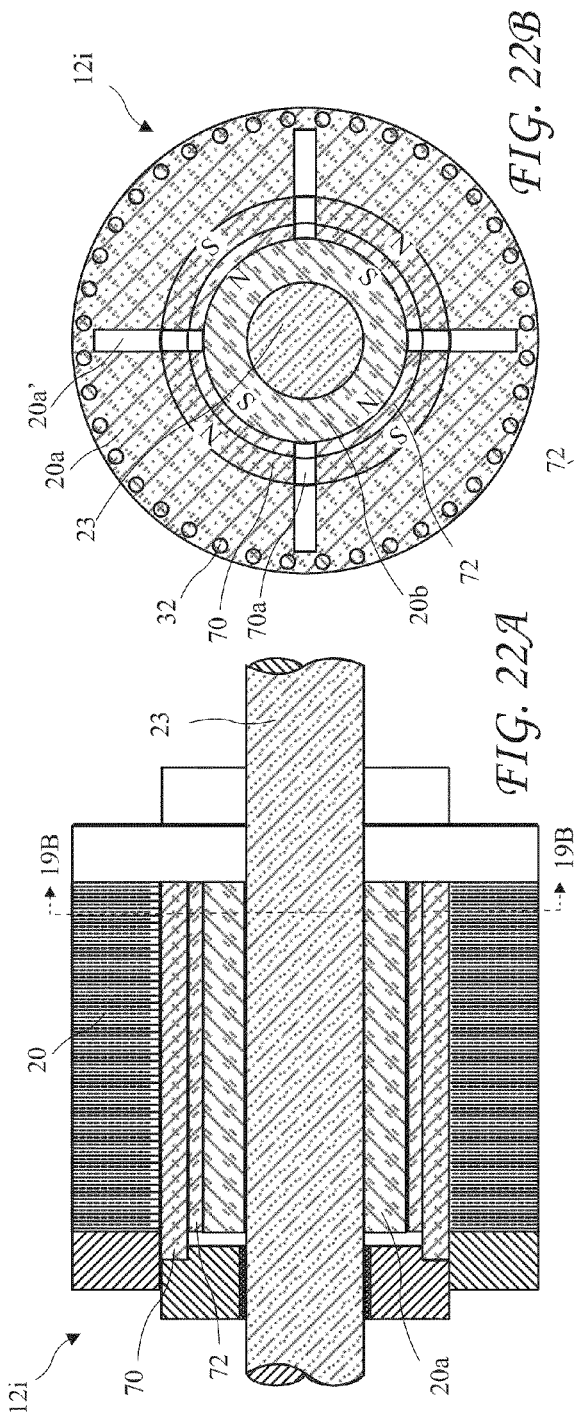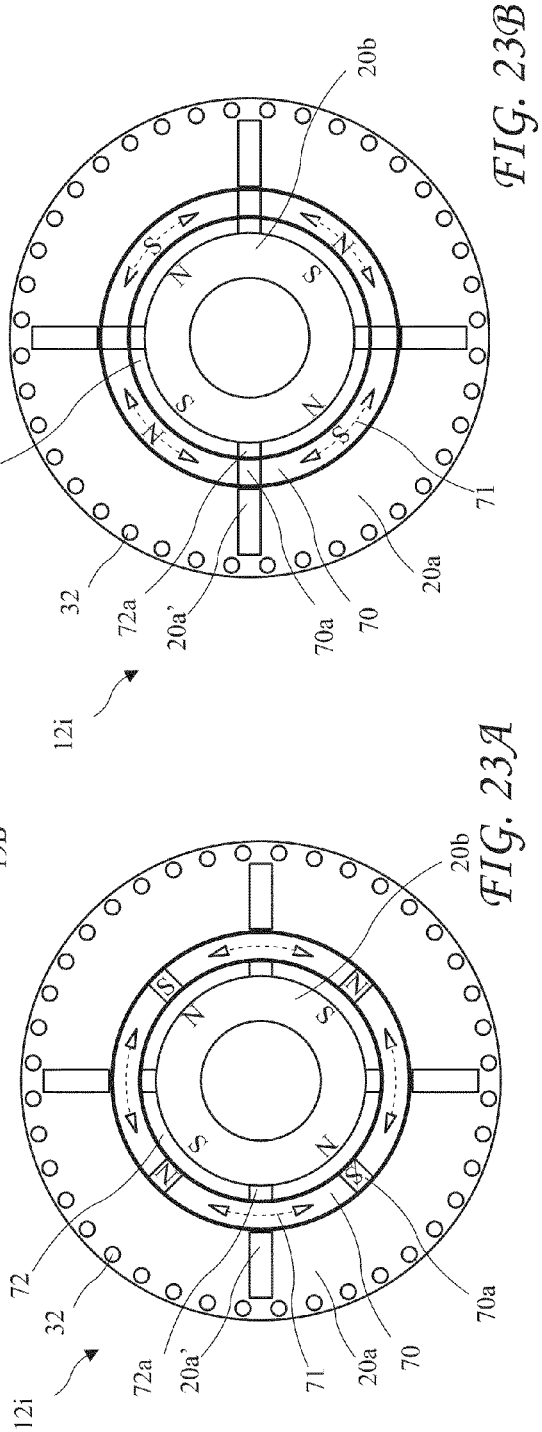

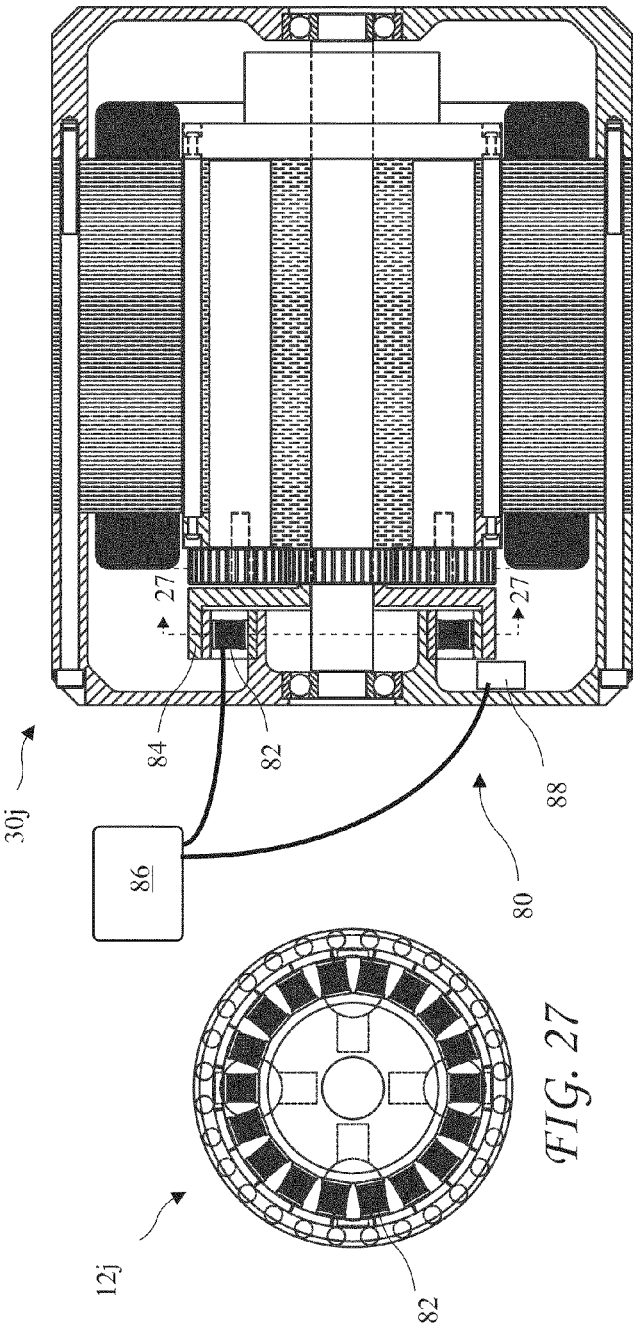
FIG. 26
FIG. 27
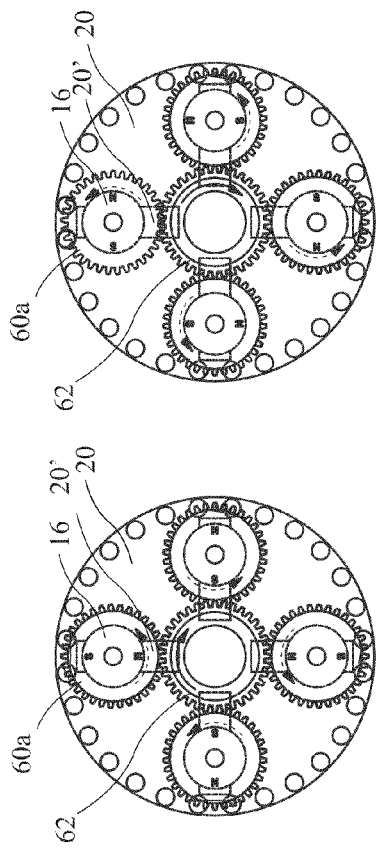
FIG. 28B
FIG. 28A

RECONFIGURABLE INDUCTIVE TO SYNCHRONOUS MOTOR

The present application is a Continuation In Part of U.S. patent application Ser. No. 12/610,184 filed Oct. 30, 2009, and of U.S. patent application Ser. No. 12/610,271 filed Oct. 30, 2009, which applications are incorporated in their entirety herein by reference.

BACKGROUND OF THE INVENTION

The present invention relates to electric motors and in particular to moveable permanent magnets, and/or non-magnetically conducting shunting pieces, in a rotor to reconfigure the motor from an asynchronous induction motor at startup into a synchronous motor for efficient operation.

A preferred form of electric motors are brushless AC induction motors. The rotors of induction motors include a cage (or squirrel cage resembling a "hamster wheel") rotating inside the stator. The cage comprises axially running bars angularly spaced apart on the outer perimeter of the rotor. An AC current provided to the stator introduces a rotating stator magnetic field in the stator, and the rotating field inductively induces current in the bars. The current induced in the bars then cooperate with the same stator magnetic field to produce torque and thus rotation of the motor.

The introduction of current into the bars requires that the bars are not moving (or rotating) synchronously with the rotating stator magnetic field because electromagnetic induction requires relative motion between a magnetic field and a conductor in the field. As a result, the rotor must slip with respect to the rotating stator magnetic field to induce current in the bars and thus produce torque, and the induction motors are therefore asynchronous motors.

Unfortunately, low power induction motors are not highly efficient, and lose efficiency under reduced loads because the amount of power consumed by the stator remains constant at low loads.

One approach to improving induction motor efficiency has been to add permanent magnets to the rotor. The motor initially starts in the same manner as a typical induction motor, but as the motor reached its operating speed, the stator magnetic field cooperates with the permanent magnets to enter synchronous operation. Unfortunately, the permanent magnets are limited in size because if the permanent magnets are too large, they prevent the motor from starting. Such size limitation limits the benefit obtained from the addition of the permanent magnets.

BRIEF SUMMARY OF THE INVENTION

The present invention addresses the above and other needs by providing a reconfigurable electric motor which includes a rotor containing rotatable permanent magnets or non-magnetically conducting shunting pieces. The magnets and/or shunting pieces have a first position producing a weak magnetic field for asynchronous induction motor operation at startup and a second position producing a strong magnetic field for efficient synchronous operation. The motor includes a squirrel cage for induction motor operation at startup with the permanent magnets and/or shunting pieces positioned to product the weak magnetic field to not interfere with the startup. When the motor approaches or reaches synchronous RPM, the permanent magnets and/or shunting pieces rotate to produce a strong magnetic field for high efficiency synchronous operation. The position of the magnets and/or shunting pieces may be controlled by a centrifugal mechanism, or viscous damping may delay rotation of the magnets and/or shunting pieces, or electrically controlled apparatus may control positions of the magnets and/or shunting piece.

In accordance with one aspect of the invention, there is provided a reconfigurable brushless AC electric motor, starting in asynchronous mode and transitioning after startup to a more efficient synchronous mode. The motor includes a stator receiving an AC power signal and generating a rotating stator magnetic field, and a rotor cooperating with the rotating stator magnetic field. The rotor includes bars forming a squirrel cage structure for inductively cooperation with the rotating stator magnetic field providing the asynchronous mode of operation for motor startup, and at least one rotatable permanent magnet for efficient synchronous operation. The permanent magnet resides inside the rotor and magnetically cooperates with pole pieces. The permanent magnet has a first position resulting in a weak magnetic field to allow the inductive motor startup and is rotatable to a second position resulting in a strong magnetic field for cooperation with the rotating stator magnetic field for efficient synchronous operation.

In accordance with another aspect of the invention, there is provided a reconfigurable from asynchronous to synchronous electric motor having a magnetic circuit including a plurality of rotatable cylindrical magnets, or a rotatable single rotatable hollow cylindrical magnet. The magnets have a first position producing a weak magnetic field for asynchronous operation, and a second position producing a strong magnetic field for synchronous operation.

In accordance with still another aspect of the invention, there is provided a reconfigurable from asynchronous to synchronous electric motor having a magnetic circuit including plurality of rotatable non-magnetically conducting shunting pieces, or a single rotatable hollow cylindrical non-magnetically conducting shunting pieces. The non-magnetically conducting shunting pieces have a first position interfering with the magnetic circuit to create a weak magnetic field, and a second position negligibly interfering with the magnetic circuit to produce a strong magnetic field.

In accordance with yet another aspect of the invention, there is provided a centrifugal latching mechanism which retains the permanent magnet in the weak magnetic field position for startup and until sufficient RPM is reached to transition to synchronous operation. An exemplar centrifugal latching mechanism includes springs holding pins engaged with the rotatable permanent magnets, and weights which overcome the springs at sufficient RPM to release the magnets.

In accordance with still another aspect of the invention, there is provided a viscous damping material, for example, silicone, either surrounding the rotatable permanent magnets to resist rotation of the permanent magnets, or in a chamber enclosing paddles attached to the rotatable magnets to resist rotation of the permanent magnets, to retain a weak magnetic field for asynchronous startup. After a short time the magnets rotate to provide a strong magnetic field for efficient synchronous operation.

In accordance with another aspect of the invention, there is provided electro-mechanical apparatus for controlling the position of the magnets and/or non-magnetically conducting shunting pieces. The electro-mechanical apparatus may be controlled by a processor to provide an optimal magnetic field for the present state of the electric motor. For example, when due to a load on the motor, the motor is slow in reaching synchronous speed, or an increase in load drops motor RPM, the electro-mechanical apparatus may reduce the magnetic field to help the motor reach or return to synchronous operation. Such electro-mechanical apparatus is typically applicable to large and/or expensive motors.

In accordance with yet another aspect of the invention, there are provided methods for adjusting the magnetic field in a motor and/or generator to provide more efficient operation over a broad RPM range.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 3 is a cross-sectional view of the reconfigurable electric motor according to the present invention taken along line 3-3 of FIG. 2 showing an embodiment of the present invention with a single two pole permanent magnet in a radially aligned rotor configuration.

FIG. 4 is a cross-sectional view of the reconfigurable electric motor according to the present invention taken along line 3-3 of FIG. 2 showing an embodiment of the present invention with a single four pole permanent magnet in a radially aligned rotor configuration.

FIG. 5 is a cross-sectional view of the reconfigurable electric motor according to the present invention taken along line 3-3 of FIG. 2 showing an embodiment of the present invention with a single four pole hollow permanent magnet in a radially aligned rotor configuration.

FIG. 9A is a cross-sectional view of the reconfigurable electric motor according to the present invention taken along line 3-3 of FIG. 2 showing an embodiment of the present invention with a single permanent magnet rotated to provide a minimum magnetic field in a radially aligned rotor configuration.

FIG. 9B is a cross-sectional view of the reconfigurable electric motor according to the present invention taken along line 3-3 of FIG. 2 showing an embodiment of the present invention with a single permanent magnet rotated to provide a maximum magnetic field in a radially aligned rotor configuration.

FIG. 10A is a cross-sectional view of the reconfigurable electric motor according to the present invention taken along line 3-3 of FIG. 2 showing an embodiment of the present invention with a single four pole permanent magnet rotated to provide a minimum magnetic field in a radially aligned rotor configuration.

FIG. 10B is a cross-sectional view of the reconfigurable electric motor according to the present invention taken along line 3-3 of FIG. 2 showing an embodiment of the present invention with a single four pole permanent magnet rotated to provide a maximum magnetic field in a radially aligned rotor configuration.

FIG. 11A is a cross-sectional view of the reconfigurable electric motor according to the present invention taken along line 3-3 of FIG. 2 showing an embodiment of the present invention with a single hollow four pole permanent magnet rotated to provide a minimum magnetic field in a radially aligned rotor configuration.

FIG. 11B is a cross-sectional view of the reconfigurable electric motor according to the present invention taken along line 3-3 of FIG. 2 showing an embodiment of the present invention with a single hollow four pole permanent magnet rotated to provide a maximum magnetic field in a radially aligned rotor configuration.

FIG. 15A is a side cross-sectional view of the reconfigurable electric motor according to the present invention with a centrifugal latching mechanism holding a single permanent magnet in a minimum magnetic field position.

FIG. 15B is an end view of the reconfigurable electric motor according to the present invention with the centrifugal latching mechanism holding the single permanent magnet in a minimum magnetic field position.

FIG. 16A is a side cross-sectional view of the reconfigurable electric motor according to the present invention with the centrifugal latching mechanism releasing the single permanent magnet in a maximum magnetic field position.

FIG. 16B is an end view of the reconfigurable electric motor according to the present invention with the centrifugal latching mechanism releasing the single permanent magnet in a maximum magnetic field position.

FIG. 20A shows a side cross-sectional view of a reconfigurable rotor according to the present invention with end to end half length magnets misaligned to provide a weak magnetic field.

FIG. 20B shows a cross-sectional view of the reconfigurable rotor according to the present invention with end to end half length magnets misaligned to provide a weak magnetic field taken along line 20B-20B of FIG. 20A.

FIG. 21A shows a side cross-sectional view of the reconfigurable rotor according to the present invention with end to end half length magnets aligned to provide a strong magnetic field.

FIG. 21B shows a cross-sectional view of the reconfigurable rotor according to the present invention with end to end half length magnets aligned to provide a strong magnetic field taken along line 21B-21B of FIG. 21A.

FIG. 22A is a side cross-sectional view of a magnetically shunted rotor according to present invention having fixed magnets and magnetic shunting to reconfigure the rotor.

FIG. 22B is a cross-sectional view of the magnetically shunted rotor taken along line 22B-22B of FIG. 22A.

FIG. 23A shows the magnetically shunted rotor with the magnetic fields created by permanent magnets in the rotor shunted for minimum effective magnetic fields.

FIG. 23B shows the magnetically shunted rotor with unshunted magnetic fields created by permanent magnets in the rotor for maximum effective magnetic fields.

FIG. 26 shows a side view of a first embodiment of the actuating mechanism according to the present invention, having a brushless actuator motor controlling the position of the permanent magnet of the rotor of a large motor.

FIG. 27 shows a cross-sectional view of the first embodiment of the brushless actuator motor taken along line 27-27 of FIG. 26.

FIG. 28A shows the magnets of motor misaligned by the first embodiment of the actuating mechanism to create a weak magnetic field.

FIG. 28B shows the magnets of motor aligned by the first embodiment of the actuating mechanism to create a strong magnetic field.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1A:
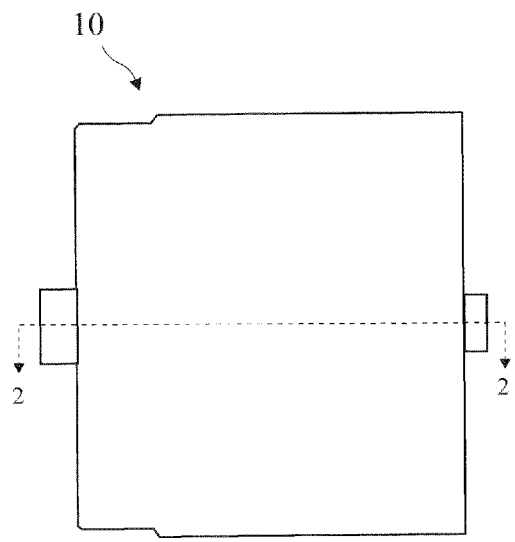
FIG. 1A is a side view of a reconfigurable electric motor according to the present invention.
Figure 1B:
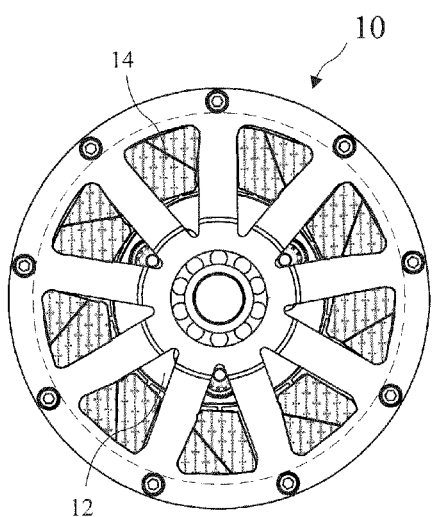
FIG. 1B is an end view of the reconfigurable electric motor.
Figure 2:
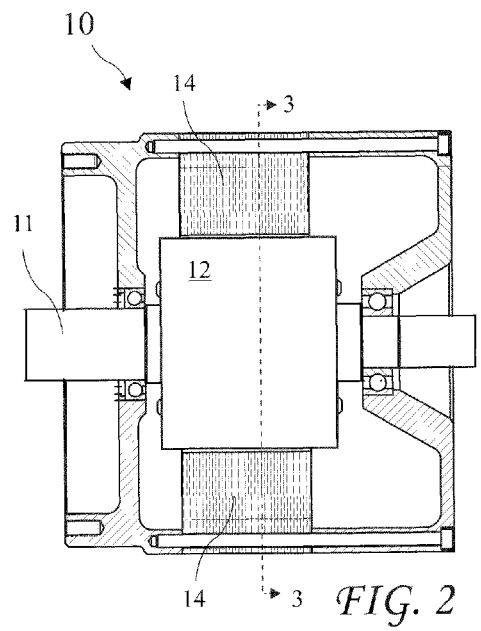
FIG. 2 is a cross-sectional view of the reconfigurable electric motor according to the present invention taken along line 2-2 of FIG. 1A.

A side view of a reconfigurable electric motor 10 according to the present invention is shown in FIG. 1A, an end view of the reconfigurable electric motor 10 is shown in FIG. 1B, and a cross-sectional view of the reconfigurable electric motor 10 taken along line 2-2 of FIG. 1A is shown in FIG. 2. The motor 10 includes stator windings 14 and a rotor 12 residing on a rotatable motor shaft 11 and inside the stator windings 14. The motor 10 is a brushless AC inductive motor including at least one permanent magnet 16 (see FIGS. 3-7) in the rotor 12, which magnet 16 may be adjusted to provide a weak magnetic field at startup for initial asynchronous operation and a strong magnetic field after startup for efficient synchronous operation.

A cross-sectional view of the reconfigurable electric motor 10 taken along line 3-3 of FIG. 2 showing a first embodiment of the motor 10 comprising a two pole motor 30a with a single two pole rotatable Interior Permanent Magnet (IPM) 16 in the rotor 12a is shown residing coaxial with the motor shaft 11 in FIG. 3. The magnet 16 is shown with air gaps 21 on each side of the magnet 16 splitting the North (N) and South (S) poles of the magnet 16 in a radially aligned configuration. Bars 32 of a squirrel cage element for inductive operation are angularly spaced apart around the outer radius of the rotor 12 reaching the length of the rotor 12. The bar may be straight or may be twisted to reduce noise among other benefits. The magnet 16 and rods 32 are carried by rotor pole pieces 20 separated by the air gaps 21. The pole pieces 20 are preferably constructed from laminated layers of individually insulated magnetically conducting material, for example, iron or steel.

A cross-sectional view of the reconfigurable electric motor 10 according to the present invention taken along line 3-3 of FIG. 2 showing a second embodiment of the motor 10 comprising a four pole motor 30b with a single four pole rotatable permanent magnet 16a residing coaxial with the motor shaft 11 in a radially aligned rotor 12b configuration is shown in FIG. 4. The pole piece 20 is divided into four quarter sections with air gaps 21 between adjacent sections. The motor 30b is otherwise like the motor 30a.

A cross-sectional view of the reconfigurable electric motor 10 according to the present invention taken along line 3-3 of FIG. 2 showing a third embodiment of the motor 10 comprising a four pole motor 30c with a rotor 12c having a single hollow four pole rotatable permanent magnet 16b residing coaxial with the motor shaft 11 in a radially aligned rotor configuration is shown in FIG. 5. A steel shaft 23 runs through the center of the hollow magnet 16b. The motor 30c is otherwise like the motor 30b.

Figure 2A:
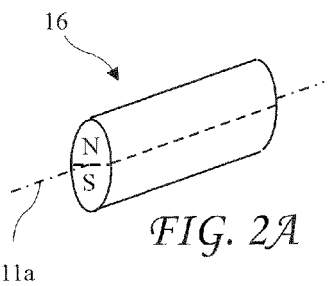
FIG. 2A shows a typical two pole permanent magnet according to the present invention.

A perspective view of a cylindrical two pole permanent magnet 16 suitable for use with the present invention is shown in FIG. 2A. The magnet 16 has a magnet axis 11a. While a cylindrical magnet is a preferred shape for a rotating magnet according to the present invention, other shapes may be adapted to be moveable to obtain the benefit of the present invention and an electric motor having moveable magnets of any shape configured to adjust a rotor magnetic field to a weak magnetic field for asynchronous operation and to a strong magnetic field for synchronous operation is intended to come within the scope of the present invention.

Figures 6, 7, 8:
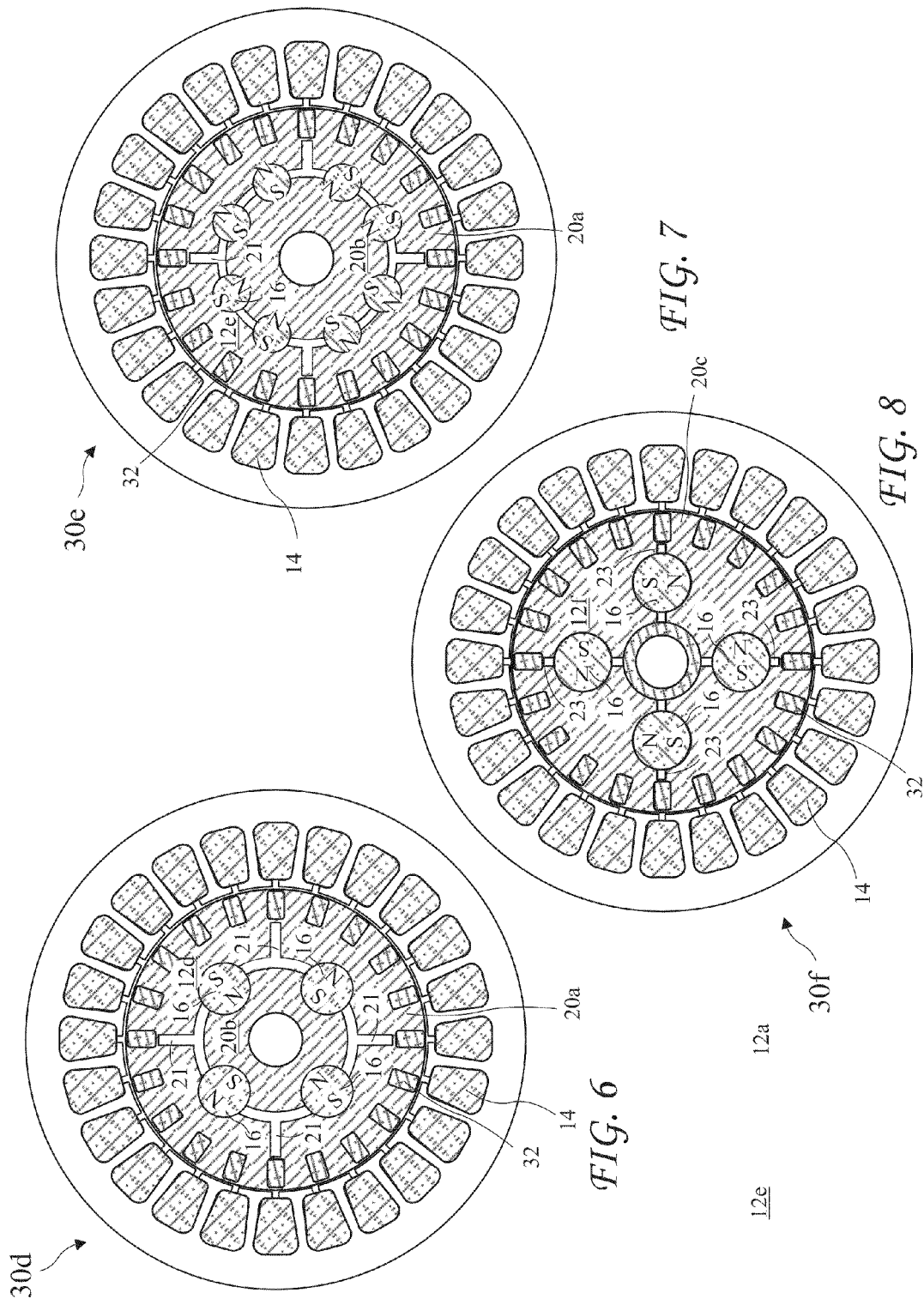
FIG. 6 is a cross-sectional view of the reconfigurable electric motor according to the present invention taken along line 3-3 of FIG. 2 showing an embodiment of the present invention with four permanent magnets in a radially aligned rotor configuration.
FIG. 7 is a cross-sectional view of the reconfigurable electric motor according to the present invention taken along line 3-3 of FIG. 2 showing an embodiment of the present invention with four pairs of permanent magnets in a radially aligned rotor configuration.
FIG. 8 is a cross-sectional view of the reconfigurable electric motor according to the present invention taken along line 3-3 of FIG. 2 showing an embodiment of the present invention with four permanent magnets in a flux squeeze rotor configuration.

A cross-sectional view of the reconfigurable four pole electric motor 10 according to the present invention taken along line 3-3 of FIG. 2 showing a fourth embodiment of the motor 10 comprising a four pole motor 30d with four two pole rotatable permanent magnets 16 angularly spaced apart with magnet axes parallel with the motor shaft 11 in a radially aligned rotor 12d configuration is shown in FIG. 6. The pole piece comprises four outer pole pieces 20a and a single hollow center pole piece 20b. The magnets 16 are sandwiched radially between the center pole piece 20b and the outer pole pieces 20a and air gaps 21 separate each outer pole piece 20a from an adjacent outer pole piece 20a and separate the center pole piece 20b from the outer pole pieces 20a. Bars 32 of the squirrel cage element for inductive operation are angularly spaced apart around the outer radius of the rotor 12 reaching the length of the rotor 12. The bar may be straight or may be twisted to reduce noise among other benefits. The pole pieces 20a and 20b are preferably constructed from laminated layers of insulated magnetically conducting material, for example, iron or steel.

A cross-sectional view of the reconfigurable four pole electric motor 10 according to the present invention taken along line 3-3 of FIG. 2 showing a fifth embodiment of the motor 10 comprising a four pole motor 30e with a rotor 12e having four pairs of two pole rotatable permanent magnets 16 angularly spaced apart with magnet axes parallel with the motor shaft 11 in a radially aligned rotor configuration is shown in FIG. 7. Other similar embodiments may include groups of magnets comprising four groups of three or more magnets. The motor 30e is otherwise like the motor 30d.

A cross-sectional view of the reconfigurable four pole electric motor 10 according to the present invention taken along line 3-3 of FIG. 2 showing a sixth embodiment of the motor 10 comprising a four pole motor 30f with a rotor 12f having four two pole rotatable permanent magnets 16 angularly spaced apart with magnet axes parallel with the motor shaft 11 in a flux squeeze rotor configuration is shown in FIG. 8. The four magnets 16 reside angularly between four angularly spaced apart pole pieces 20c. The motor 30f is otherwise like the motor 30d.

A cross-sectional view of the motor 30a (see FIG. 3) taken along line 3-3 of FIG. 2 with the single two pole permanent magnet 16 rotated to provide a minimum (or weak) magnetic field 24a is shown in FIG. 9A. The weak magnetic field 24a is radially collapsed inside the rotor 12a by the misalignment of the permanent magnet 16 with the rotor pole pieces 20 (see FIG. 3) to reduce or eliminate cooperation with the stator magnetic field, and does not interfere with starting the motor 30a in an inductive mode for initial asynchronous operation.

A cross-sectional view of the motor 30a taken along line 3-3 of FIG. 2 with the single two pole permanent magnet 16 rotated to provide a maximum (or strong) magnetic field 24b is shown in FIG. 9B. The strong magnetic filed 24b is created by aligning the permanent magnet 16 with the rotor pole pieces 20 thereby radially expanding the magnetic field 24b to cooperate with the stator magnetic field. The strong magnetic field 24b would interfere with starting the motor 30a, but provides more efficient operation in a synchronous more after startup of the motor 30a.

A cross-sectional view of the motor 30b (see FIG. 4) taken along line 3-3 of FIG. 2 with the single four pole permanent magnet 16a rotated to provide a minimum (or weak) magnetic field 24a is shown in FIG. 10A. The weak magnetic field 24a does not interfere with starting the motor in an inductive mode for initial asynchronous operation.

A cross-sectional view of the motor 30b taken along line 3-3 of FIG. 2 with the single four pole permanent magnet 16a rotated to provide a maximum (or strong) magnetic field is shown in FIG. 10B. The strong magnetic field 24b would interfere with starting the motor 30b, but provides more efficient operation in a synchronous more after startup of the motor 30b.

A cross-sectional view of the motor 30c (see FIG. 5) taken along line 3-3 of FIG. 2 with the single hollow four pole permanent magnet 16b rotated to provide a minimum (or weak) magnetic field 24a is shown in FIG. 11A. The weak magnetic field 24a does not interfere with starting the motor in an inductive mode for initial asynchronous operation.

A cross-sectional view of the motor 30c taken along line 3-3 of FIG. 2 with the single hollow four pole permanent magnet 16b rotated to provide a maximum (or strong) magnetic field is shown in FIG. 11B. The strong magnetic field 24b would interfere with starting the motor 30c, but provides more efficient operation in a synchronous more after startup of the motor 30c.

Figure 12A:
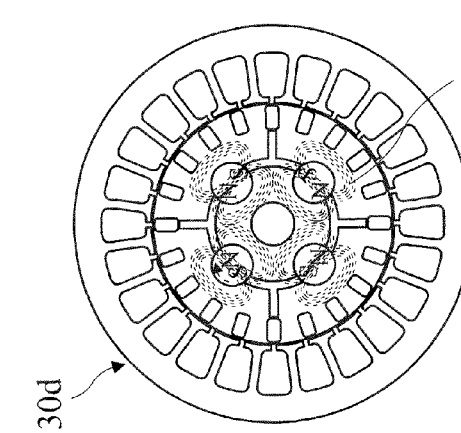
FIG. 12A is a cross-sectional view of the reconfigurable electric motor according to the present invention taken along line 3-3 of FIG. 2 showing an embodiment of the present invention with four permanent magnets rotated to provide a minimum magnetic field in a radially aligned rotor configuration.

A cross-sectional view of the motor 30d (see FIG. 6) taken along line 3-3 of FIG. 2 with the four two pole permanent magnets 16 rotated to provide a minimum (or weak) magnetic field 24a is shown in FIG. 12A. The weak magnetic field 24a does not interfere with starting the motor 30d in an inductive mode for initial asynchronous operation.

Figure 12B:
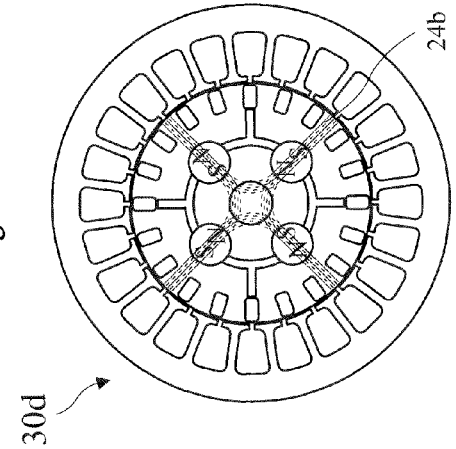
FIG. 12B is a cross-sectional view of the reconfigurable electric motor according to the present invention taken along line 3-3 of FIG. 2 showing an embodiment of the present invention with four permanent magnets rotated to provide a maximum magnetic field in a radially aligned rotor configuration.
Figure 18B:
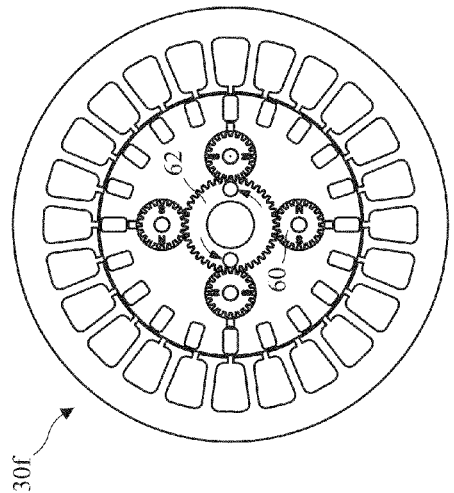
FIG. 18B is an end view of the reconfigurable electric motor according to the present invention with the centrifugal latching mechanism releasing the four permanent magnets in a maximum magnetic field position.

A cross-sectional view of the motor 30d taken along line 3-3 of FIG. 2 with the four two pole permanent magnets 16 rotated to provide a maximum (or strong) magnetic field is shown in FIG. 12B. The strong magnetic field 24b would interfere with starting the motor 30d, but provides more efficient operation in a synchronous more after startup of the motor 30d.

Figure 13A:
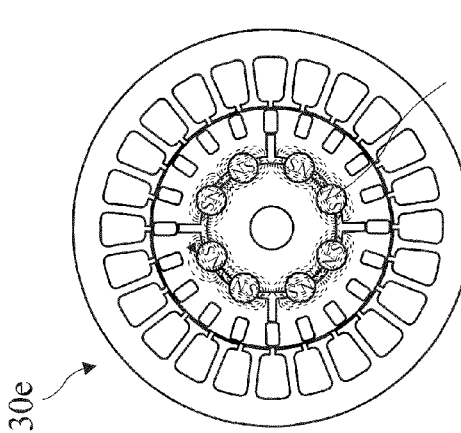
FIG. 13A is a cross-sectional view of the reconfigurable electric motor according to the present invention taken along line 3-3 of FIG. 2 showing an embodiment of the present invention with four pairs of permanent magnets rotated to provide a minimum magnetic field in a radially aligned rotor configuration.

A cross-sectional view of the motor 30e (see FIG. 7) taken along line 3-3 of FIG. 2 with the four pairs of two pole permanent magnets 16 rotated to provide a minimum (or weak) magnetic field 24a is shown in FIG. 13A. The weak magnetic field 24a does not interfere with starting the motor 30e in an inductive mode for initial asynchronous operation.

Figure 13B:
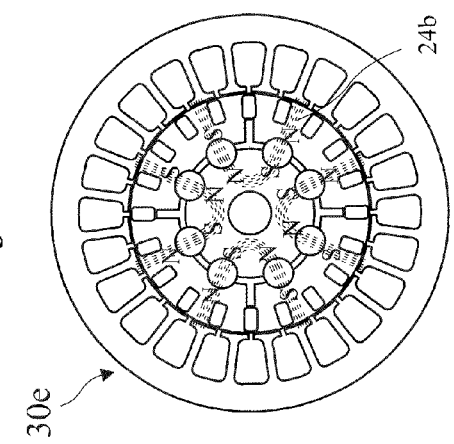
FIG. 13B is a cross-sectional view of the reconfigurable electric motor according to the present invention taken along line 3-3 of FIG. 2 showing an embodiment of the present invention with four pairs of permanent magnets rotated to provide a maximum magnetic field in a radially aligned rotor configuration.

A cross-sectional view of the motor 30e taken along line 3-3 of FIG. 2 with the four pairs of two pole permanent magnets 16 rotated to provide a maximum (or strong) magnetic field is shown in FIG. 13B. The strong magnetic field 24b would interfere with starting the motor 30e, but provides more efficient operation in a synchronous more after startup of the motor 30e.

Figure 14A:
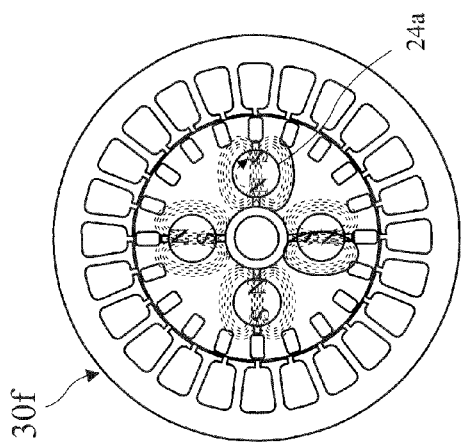
FIG. 14A is a cross-sectional view of the reconfigurable electric motor according to the present invention taken along line 3-3 of FIG. 2 showing an embodiment of the present invention with four permanent magnets rotated to provide a minimum magnetic field in a flux squeeze rotor.

A cross-sectional view of the motor 30f (see FIG. 8) taken along line 3-3 of FIG. 2 with the four two pole permanent magnets 16 rotated to provide a minimum (or weak) magnetic field 24a in the flux squeeze rotor configuration is shown in FIG. 14A. The weak magnetic field 24a does not interfere with starting the motor 30f in an inductive mode for initial asynchronous operation.

Figure 14B:
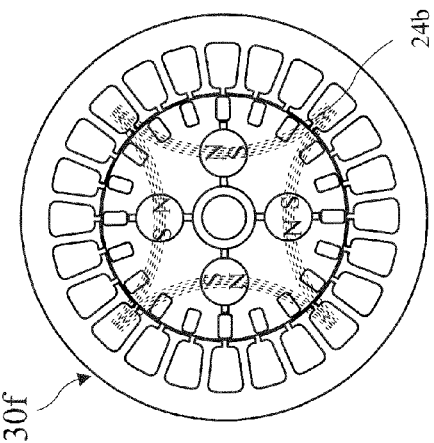
FIG. 14B is a cross-sectional view of the reconfigurable electric motor according to the present invention taken along line 3-3 of FIG. 2 showing an embodiment of the present invention with four permanent magnets rotated to provide a maximum magnetic field in a flux squeeze rotor.

A cross-sectional view of the motor 30f taken along line 3-3 of FIG. 2 with the four two pole permanent magnets 16 rotated to provide a maximum (or strong) magnetic field in the flux squeeze rotor configuration is shown in FIG. 14B. The strong magnetic field 24b would interfere with starting the motor 30f, but provides more efficient operation in a synchronous more after startup of the motor 30f.

A side cross-sectional view of the motor 30a (see FIG. 3) with a centrifugal latching mechanism 40 holding the single permanent magnet 16 in a minimum magnetic field position (see FIG. 9A) is shown in FIG. 15A and a corresponding end view of the motor 30a with the centrifugal latching mechanism holding the single permanent magnet in the minimum magnetic field position (see FIG. 9A) is shown in FIG. 15B. A second side cross-sectional view of the motor 30a with the centrifugal latching mechanism 40 having released the single permanent magnet 16 to the maximum magnetic field position is shown in FIG. 16A and a corresponding end view of the motor 30a with the centrifugal latching mechanism having released the single permanent magnet to the maximum magnetic field position is shown in FIG. 16B. The centrifugal latching mechanism 40 includes weights 44, rotating plate 50, spring disk 48, sliding plate 46, pins 42, and pin seats 52. The weights 44 and spring disk 48 are selected so that at an appropriate RPM the weights 44 move outward causing the spring disk 48 to snap from a first extended position as in FIG. 15A to a retraced position as in FIG. 16A thereby retracting the pins 42 from seats 52 releasing the magnet 16.

The magnet 16 is magnetically urged to the weak magnetic field position when the motor 30a is stationary, and the centrifugal latching mechanism 40 also urges the pins 42 into the pin seats 52 when the motor 30a is stationary. As a result, the motor 30a returns to the weak magnet mode whenever the motor 30a stops allowing the motor to startup as an asynchronous induction motor. When the motor 30a reaches sufficient RPM, the centrifugal latching mechanism 40 pulls the pins 42 from the pin seats 52 releasing the magnet 16. At sufficient RPM, the magnetic fields in the motor 30a urge the permanent magnet 16 to rotate 90 degrees to the strong magnet position, thus providing efficient synchronous operation.

An example of a suitable centrifugal latching mechanism is the Synchrosnap® Centrifugal mechanism made by TORQ Corp. in Bedford, Ohio. For use in the present invention, the Synchrosnap® Centrifugal mechanism is only slightly modified to actuate the pins 42 instead of providing an electrical switch function.

Figure 17B:
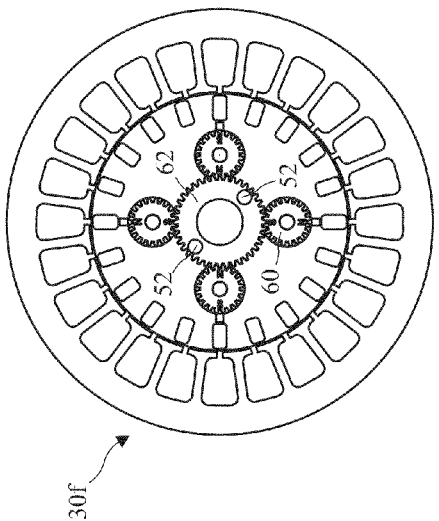
FIG. 17B is an end view of the reconfigurable electric motor according to the present invention with the centrifugal latching mechanism holding the four permanent magnets in a minimum magnetic field position.
Figure 17A:
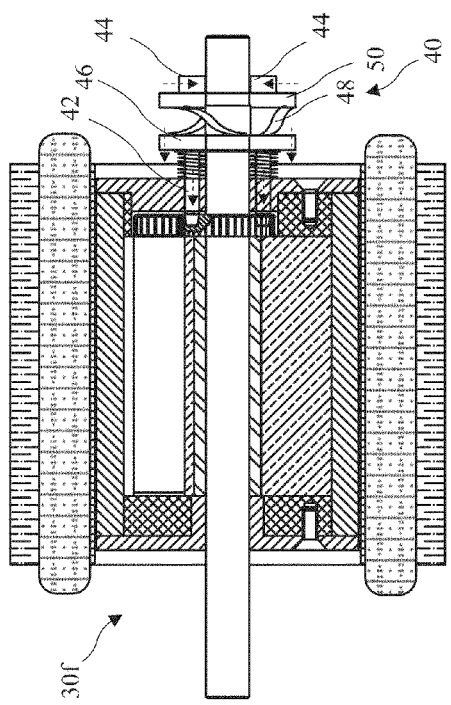
FIG. 17A is a side cross-sectional view of the reconfigurable electric motor according to the present invention with the centrifugal latching mechanism holding four permanent magnets in a minimum magnetic field position.
Figure 18A:
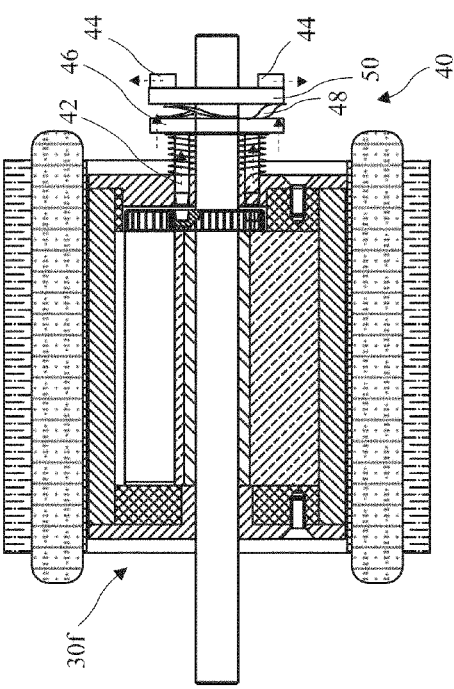
FIG. 18A is a side cross-sectional view of the reconfigurable electric motor according to the present invention with the centrifugal latching mechanism releasing the four permanent magnets in a maximum magnetic field position.

A second example of the apparatus for switching between a weak magnetic field and a strong magnetic field 24b applied to the motor 30f (see FIG. 8) is shown in FIGS. 17A (side view weak field), 17B (end view weak field), 18A (side view strong field), and 18B (end view strong field). The four magnets 16 of the motor 30f each are attached to a small gear 60, and the small gears all engage a larger gear 62, whereby all of the magnets 16 remain rotationally aligned. The pins 42 engage the pin seats 52 in the large gear 62 when the motor 30f is at rest, and when the motor 30f reaches sufficient RPM, the centrifugal latching mechanism 40 pulls the pins 42 from the pin seats 52 releasing the magnet 16. As with the motor 30a, the permanent magnets 16 of the motor 30f are magnetically urged to the weak field position (see FIG. 14A) when the motor 30f is stopped, and are magnetically urged to the strong field position (see FIG. 14B) at RPM sufficient for synchronous operation.

Figure 19B:
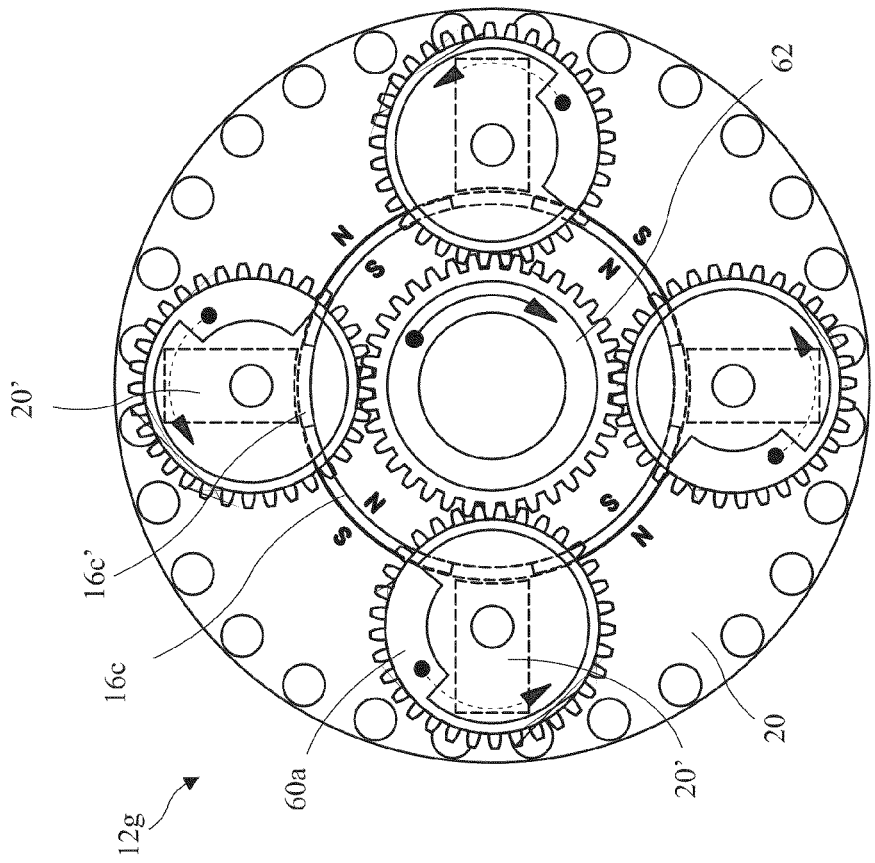
FIG. 19B is an end view of the reconfigurable electric motor rotor according to the present invention with the centrifugal latching mechanism rotating the four pole permanent magnet in a maximum magnetic field position.
Figure 19A:
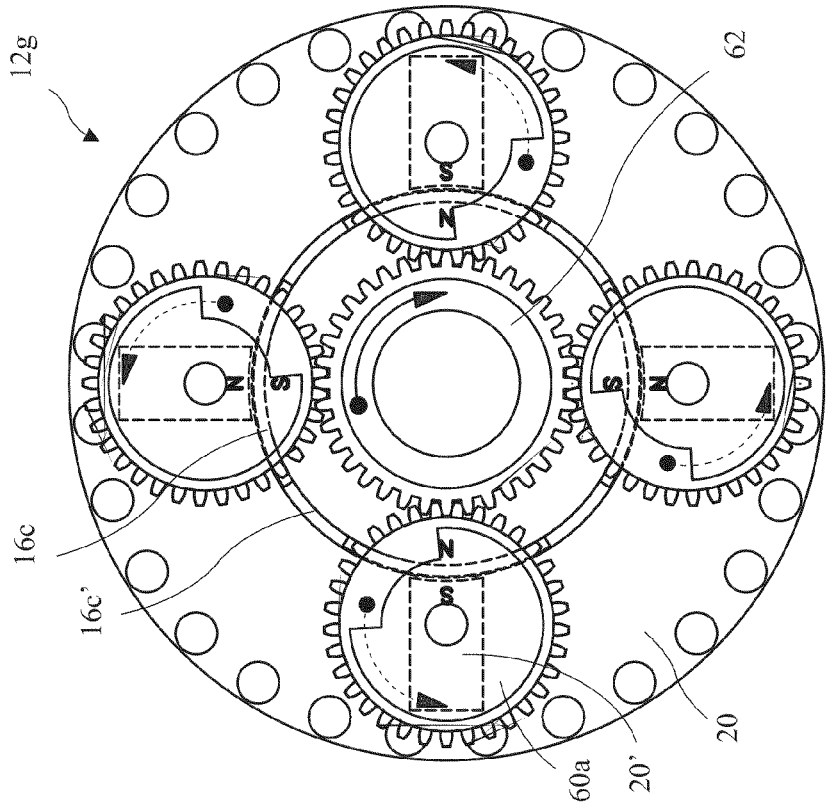
FIG. 19A is an end view of a reconfigurable electric motor rotor according to the present invention with the centrifugal latching mechanism rotating a four pole permanent magnet in a minimum magnetic field position.
Figure 24B:
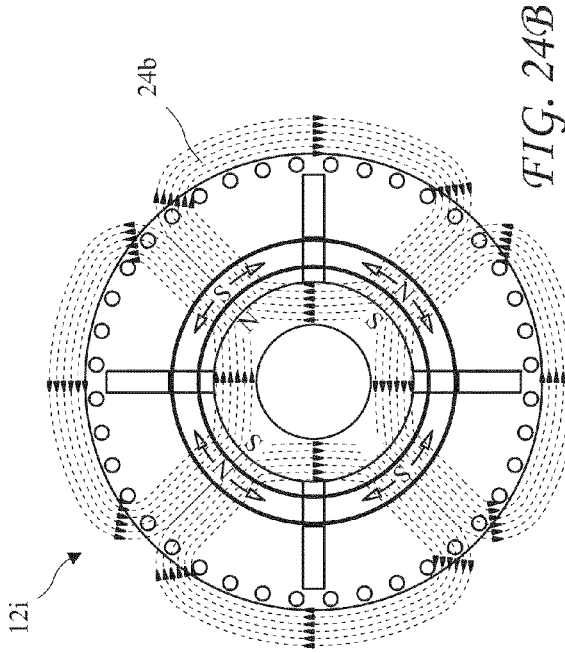
FIG. 24B shows the magnetically shunted rotor with the maximum effective magnetic fields.

An end view of a reconfigurable electric motor rotor 12g according to the present invention with a centrifugal mechanism holding a hollow cylindrical segmented four pole permanent magnet 16c (similar to the hollow four pole permanent magnet 16b in FIG. 5) in a minimum magnetic field position is shown in FIG. 19A, and an end view of the rotor 12g with the centrifugal mechanism rotating the four pole permanent magnet to a maximum magnetic field position is shown in FIG. 19B. Four weighted small gears 60a include mass imbalances, creating a torque when the rotor is rotating, to rotate each gear 60a. The gears 60a cooperate with a centered large gear 62 to rotate the gear 62 and the magnet 16c rotates with the gear 62. When the rotor 12g is stopped, the magnet 16c is biased to reside with magnet gaps 16c' between pole piece gaps 20' and the minimum magnetic field results. When the rotor 12g spins, the mass imbalances in the gears 60a cause the gears 60a to rotate also rotating the gear 62 and the magnet 16c. By the time the rotor 12g reaches synchronous operating speed, the magnet gaps 16c' are aligned with the pole piece gaps 20' to provide a maximum magnetic field for efficient synchronous operation.

A side view of a reconfigurable electric motor rotor 12h according to the present invention with end to end half length hollow cylindrical segmented four pole permanent magnets 16c having poles misaligned to provide a weak magnetic field is shown in FIG. 20A and a cross-sectional view of the reconfigurable rotor 12h with end to end half length magnets 16c misaligned to provide a weak magnetic field taken along line 20B-20B of FIG. 20A is shown in FIG. 20B. In this embodiment, the moveable first magnet 16c (i.e., the magnet nearest to a centrifugal latching mechanism 40), is rotatable to missalign the N-S poles of the first magnet 16c with the N-S poles of the fixed second magnet 16c to produce a weak magnetic field. Such weak magnetic field allows a motor including the rotor 12h to start in asynchronous mode.

A side view of the rotor 12h according to the present invention with the end to end half length hollow cylindrical segmented four pole permanent magnets 16c having poles aligned to provide a strong magnetic field is shown in FIG. 21A, and a cross-sectional view of the rotor 12h with end to end half length magnets 16c aligned to provide a strong magnetic field taken along line 21B-21B of FIG. 21A is shown in FIG. 21B. The centrifugal latching mechanism 40 holds the first magnet in misalignment until sufficient RPM is reached to allow weights 44 to overcome springs 48 to release the first magnet 16c, which will naturally tend to align with the second magnet 16c.

In other embodiments, the movement of the first magnet 16c may be controlled by other electro mechanical apparatus or by viscous damping. An example of viscous damping is surrounding the moveable magnet 16c in silicone.

A side cross-sectional view of a magnetically shunted rotor 12i according to the present invention having fixed permanent magnets 72, and a rotating non-magnetically conducting shunting ring 70 to reconfigure the rotor, is shown in FIG. 22A and a cross-sectional view of the magnetically shunted rotor 12i taken along line 22B-22B of FIG. 22A is shown in FIG. 22B. The rotating shunting ring 70 resides outside the fixed permanent magnets 72 separating the fixed permanent magnets 72 from the outer pole pieces 20a residing outside the rotating shunting ring 70, which pole pieces 20a comprise individually insulated laminated layers to minimize eddy currents.

An inner pole piece (or back iron, or magnetic indexing armature) 20b resides inside the fixed permanent magnets 72 and provide a return path for magnetic flux. The back iron 20b resides over the motor shaft 23 and the motor shaft 23 preferably cooperates with the back iron 20b to provide sufficient thickness to complete a magnetic circuit with the fixed permanent magnets 72 and the rotating shunting ring 70. The back iron 20b preferably comprises individually insulated laminated layers to minimize eddy currents as with the pole pieces 20 and 20a but the back iron 20b may be a single piece. In one embodiment, the stator, the outer pole piece 20a and the back iron 20b may be made from the same piece of lamination by punching out each shape, thereby utilizing almost all of the material and minimizing scrap thus reducing costs. In high volume applications, such as air conditioner and refrigerator motors, such manufacturing method is preferred. The fixed permanent magnets 72 and the back iron 20b might be considered a pole piece, for example, where the motor has a four pole armature, because there are four magnets.

The magnetically shunted rotor 12i is shown in FIG. 23A with the magnetic fields created by permanent magnets 72 in the rotor 12i shunted for minimum effective magnetic fields, and in FIG. 23B with the magnetic fields created by permanent magnets 72 in the rotor un-shunted for maximum effective magnetic fields. The switching between shunted and un-shunted is accomplished by rotating the shunting ring 70 along arcs 71. In the shunted position, ring gaps 70a in the rotating shunting ring 70 are out of alignment with magnet gaps 72a in the permanent magnets 72, and out of alignment with the pole piece gaps 20a' in the pole pieces 20a. In the un-shunted position, the ring gaps 70a in the rotating shunting ring 70 are aligned with the magnet gaps 72a in the permanent magnets 72 and with the pole piece gaps 20a' in the pole pieces 20a.

Figure 24A:
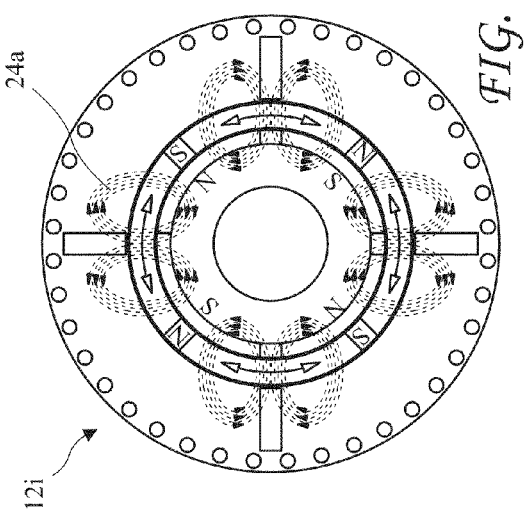
FIG. 24A shows the magnetically shunted rotor with the minimum effective magnetic fields.

The magnetically shunted rotor 12i with minimum effective magnetic fields 24 is shown in FIG. 24A and the magnetically shunted rotor 12i with maximum effective magnetic fields 24b is shown in FIG. 22B. The minimum magnetic fields allow the magnetically shunted motor to start as an asynchronous induction motor and the maximum magnetic fields allow the magnetically shunted motor to efficiently operate as a synchronous motor.

Figure 25B:
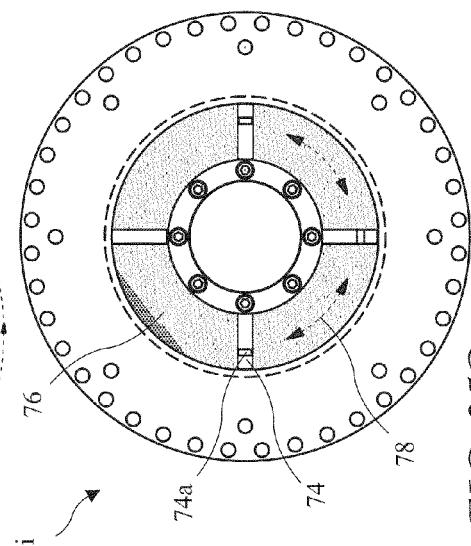
FIG. 25B is a cross-sectional view of the magnetically shunted rotor showing the paddle type damping structure taken along line 25B-25B of FIG. 25A.
Figure 25A:
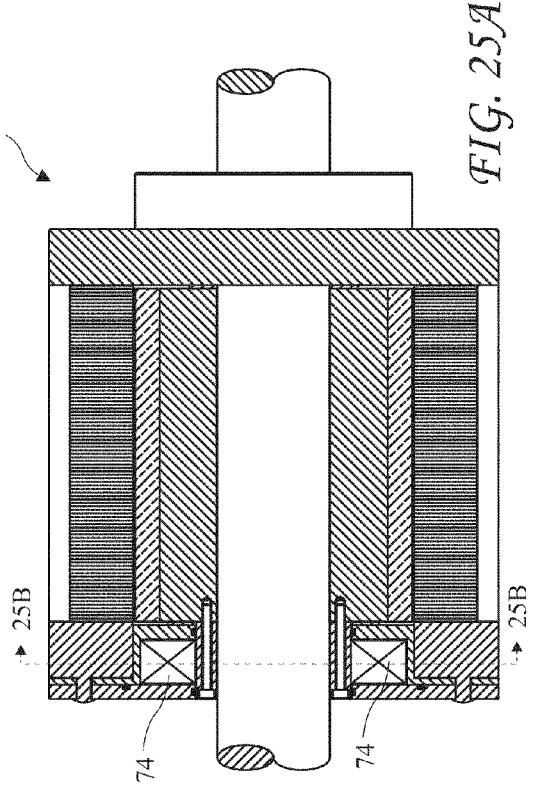
FIG. 25A is a side cross-sectional view of the magnetically shunted rotor showing a paddle type damping structure.

A side cross-sectional view of the magnetically shunted rotor 12i showing a viscous damping structure for resisting rapid changes between shunted operation and un-shunted operation is shown in FIG. 25A and a cross-sectional view of the magnetically shunted rotor 12i showing the paddle type damping structure taken along line 25B-25B of FIG. 25A is shown in FIG. 25B. The viscous damping structure is connected to the rotating shunting ring 70 to resist rotation of the rotating shunting ring 70. The magnetic fields in the rotor 12i preferably provide a natural bias of the rotating shunting ring 70 to the shunted position when the rotor 12i is at rest, and a natural bias to the un-shunted position when the motor is operating.

An example of a viscous damping structure comprises paddles 74 in a chamber filled with a viscous fluid 76. The paddles 74 may comprise a number of paddles, for example, four paddles. The viscous fluid 76 may be a silicone fluid and the viscosity of the silicone fluid may be selected to provide a desired viscous damping of the rotating shunting ring 70. The paddles 74 may include ports 74a allowing the viscous fluid to flow past the paddles 74 as the paddles move along arcs 78. Both the number of paddles 74 and the number and size of the ports 74a may be adjusted, along with the viscosity of the viscous fluid, to adjust the damping of the rotating shunting ring 70. Preferably, the rotating shunting ring 70 will be sufficiently damped to avoid oscillation of the rotating shunting ring 70 as the motor transitions from asynchronous to synchronous operation.

In another embodiment the viscous damping structure is provided by providing clearance around the rotating shunting ring 70. The clearance is filled with the viscous fluid, and the degree of damping is controlled by the selection of the viscosity of the viscous fluid. Silicone fluid is an example of a suitable viscous fluid. While the viscous damping has been described herein for a magnetically shunted rotor, such viscous damping is also intended for application to any of the embodiments of a reconfigurable electric motor described herein (for example, in FIGS. 3-8, 19A, 19B, and 20A-21B), whether using a shunting ring, or a moveable permanent magnet. In each instance, the moveable element of the magnetic circuit may be in contact with a viscous material, for example silicone, or be connected to a viscous damping structure as shown and described in FIGS. 25A and 25B. The contact may be the entire outer surface of the moveable element, or a portion of the outside surface of the moveable element. Further, the viscosity of the viscous material may be selected for individual applications to provide adequate delay in transition from a weak magnetic field to a strong magnetic field.

In general, the viscous damping delays the transition from a weak magnetic field at startup to a strong magnetic field for efficient synchronous operation. Such delay is preferably about one to five seconds, but may be more depending on the startup load, and provides a delay in the transition to a strong magnetic field at near synchronous speed. If the transition to a strong magnet field (for example, about 20 to 30 percent alignment) occurs to soon before the motor reaches synchronous speed, reduced starting torque will result, while a delay in the transition will merely cause a small short term reduction in efficiency. The viscous damping also reduced or eliminates and oscillations when the rotor transitions to a strong magnetic field.

The viscous damping described above is preferred for small inexpensive motors, such as in common appliances, and are low cost. In larger expensive motors, an electro mechanical actuator including, for example, gears and/or hydraulic, pneumatic, or electrical (solenoids), may be used to precisely control the rotor's magnetic field to optimize efficiency, some embodiments of which are disclosed in U.S. patent application Ser. No. 12/610,271 incorporated by reference above.

Because of the high costs of larger motors, an actuator feedback system is a feasible and economical addition to the reconfigurable asynchronous to synchronous motor because such actuator feedback system constitutes a small percentage of the cost related to retrofitting rotors to large motors or purchasing new large motor. In larger motors, the rotor inertia and/or load on the motor may significantly increase startup times. An electronically controlled actuating mechanism may be used to control the magnetic field of the rotor in such instances. For example, when the load on the motor exceeds the lock rotor torque, and the RPM slows below about 50 percent of synchronous speed, the actuating mechanism can misalign magnetic circuit elements in the rotor to reduce the rotor's magnetic field, allowing the motor to recover under induction torque, until the motor load is reduced or motor reaches asynchronous speed, where the actuating mechanism can realign magnetic circuit elements.

A side view of a first embodiment of the actuating mechanism, having a brushless actuator motor 80 is affixed to the permanent magnet rotor and stator of a large motor 30*j* is shown in FIG. 26 and a cross-sectional view of the brushless actuator motor 80 taken along line 27-27 of FIG. 26 is shown in FIG. 27. The actuator motor 80 is connected to a controller (or processor) 86 which is either powered by motor power or separate lower voltage supply. A sensor/encoder 88 used for rotational positional sensing is connected to the controller 86 to provide feedback and control. The actuator motor 80 comprises fixed coils 82 and an actuator rotor 84 having magnets affixed thereto. The actuator rotor 84 is connected to a rotatable permanent magnet(s) of the rotor 12*j* or to rotatable shunting pieces of the rotor 12 to adjust the rotor 12*j* to a weak rotor magnetic field for startup and to a strong rotor magnetic field for efficient synchronous operation.

FIG. 28A shows the magnets 16 of the motor 30*j* adjusted by the first embodiment of the actuating mechanism to create a weak magnetic field and FIG. 28B shows the magnets of motor adjusted by the first embodiment of the actuating mechanism to create a strong magnetic field. The actuator rotor 84 is attached directly to the gear 62, which rotates the gears 60*a* (see FIGS. 28A and 28B) attached to each cylindrical magnet 16.

During starting, the actuator motor 80, rotates at the same speed as the rotor 12*j*, using positioning sensor/encoder data to position the rotor magnets (or shunting pieces) in the weak magnetic field position, when the motor 20*j* reaches peak asynchronous speed, the actuator motor 80 may either increase speed or decrease speed to rotate the rotor magnets (or shunting pieces) of the rotor 12*j* into the strong magnetic field position, where normal flux interactions will maintain alignment and actuator motor may spin freely with rotor 12*j* without any losses.

Figure 29:
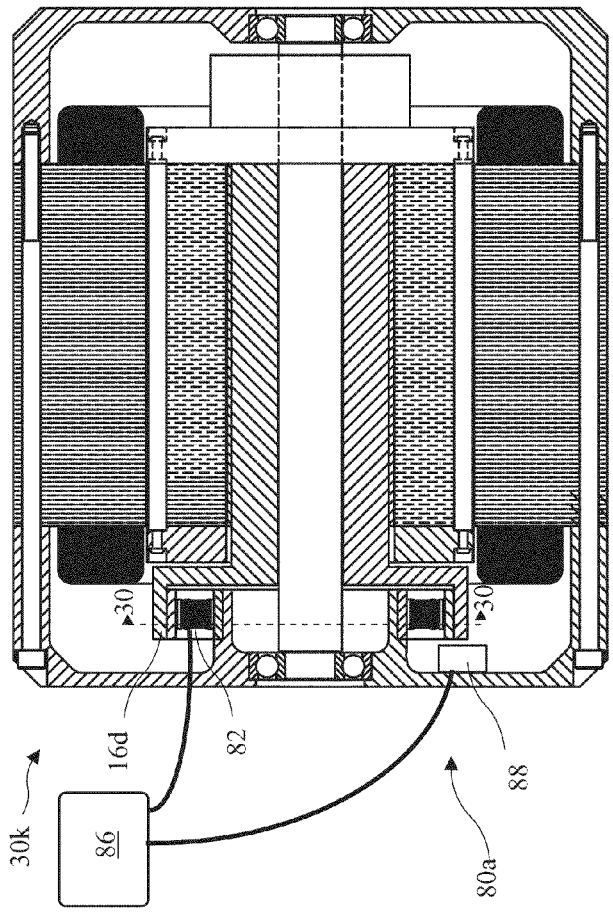
FIG. 29 shows a side view of a second embodiment of the actuating mechanism according to the present invention, having a brushless actuator motor controlling the position of the permanent magnet of the rotor of a large motor.
Figure 30:
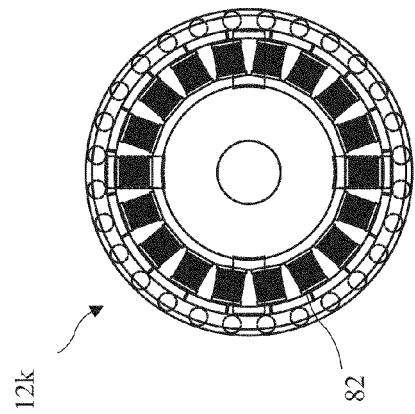
FIG. 30 shows a cross-sectional view of the second embodiment of the brushless actuator motor taken along line 30-30 of FIG. 29.

A second embodiment of the actuating mechanism according to the present invention, having a brushless actuator motor 80*a* attached to a large motor 30*k* is shown in FIG. 29 and a cross-sectional view of the brushless actuator motor 80 taken along line 30-30 of FIG. 29 is shown in FIG. 30. A cylindrical permanent magnet 16*d* includes dogleg portions extending over the coils 82 forming a rotor of the actuator motor 80*a*. The actuator motor 80 is thus able to control the position of the magnet 16*d*.

Figure 31B:
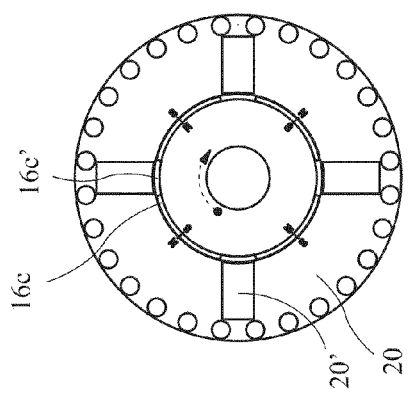
FIG. 31B shows the magnet of motor aligned by the second embodiment of the actuating mechanism to create a strong magnetic field.
Figure 31A:
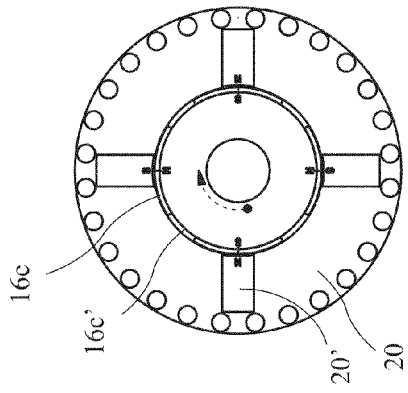
FIG. 31A shows the magnet of motor misaligned by the second embodiment of the actuating mechanism to create a weak magnetic field.

FIG. 31A shows the magnets 16*d* of the motor 30*k* controlled by the actuator motor 80 using positioning sensor/encoder 88 data and controller 86 to create a weak magnetic field and FIG. 31B shows the magnets 16*d* controlled by the actuator motor 80 to create a strong magnetic field.

While the invention herein disclosed has been described by means of specific embodiments and applications thereof, numerous modifications and variations could be made thereto by those skilled in the art without departing from the scope of the invention set forth in the claims.

We claim:

1. A reconfigurable brushless AC electric motor, operating in both asynchronous and synchronous modes, the motor comprising:
   a stator receiving an AC power signal and generating a rotating stator magnetic field;
   a rotating motor shaft;
   a rotor rotating with the motor shaft, the rotor comprising:
      inductive elements for cooperation with the rotating stator magnetic field providing the asynchronous mode of operation for motor startup;
      pole pieces fixed to the rotor; and
      at least one moveable magnetic circuit element residing inside the rotor and in cooperation with the pole pieces and having a first position resulting in a misalignment of the permanent magnets with the pole pieces creating a radially collapsed magnetic field to allow the inductive motor startup and rotatable with respect to the rotor to a second position resulting in a alignment of the permanent magnets with the pole pieces creating a radially expanded magnetic field for cooperation with the rotating stator magnetic field for efficient synchronous operation.

2. The electric motor of claim 1, wherein the rotatable magnetic circuit element comprises at least one rotatable permanent magnet.

3. The electric motor of claim 2, wherein the at least one rotatable permanent magnet comprises a single permanent magnet residing with a magnet axis parallel with the motor shaft.

4. The electric motor of claim 2, wherein the at least one rotatable permanent magnet comprises a single rotatable hollow permanent magnet residing coaxial with the motor shaft.

5. The electric motor of claim 2, wherein the at least one moveable permanent magnet comprises four angularly spaced apart parallel axis rotatable permanent magnets in a radially aligned rotor configuration.

6. The electric motor of claim 2, wherein the at least one moveable permanent magnet comprises four spaced apart parallel groups of at least two magnets in a radially aligned rotor configuration.

7. The electric motor of claim 2, wherein the at least one permanent magnet comprises four spaced apart parallel pairs of rotatable permanent magnets in a radially aligned rotor configuration.

8. The electric motor of claim 2, further including a centrifugal latching mechanism for retaining the at least one magnet in a minimum magnetic field position until sufficient RPM is reached for transition to synchronous operation.

9. The electric motor of claim 1, wherein the moveable magnetic circuit element comprises a moveable shunting piece made from a non-magnetically conducting non-magnetizable material magnetically cooperating with fixed permanent magnets and pole pieces and moveable to adjust the magnetic field to the weak magnetic field and to the strong magnetic field.

10. The electric motor of claim 9, wherein the moveable shunting piece is a rotatable shunting ring and is cylindrical and coaxial with the motor shaft and rotates about an axis coaxial with the motor shaft.

11. The electric motor of claim 10, wherein the rotatable shunting ring comprises a rotatable cylindrical shape with shunting sections separated by front to rear reaching first gaps and the fixed permanent magnets comprise a cylindrical shape with magnet sections separated by front to rear reaching second gaps.

12. The electric motor of claim 11, wherein the rotatable shunting ring resides inside pole pieces of the rotor and the fixed permanent magnets reside inside the rotatable shunting ring.

13. The electric motor of claim 12, wherein the pole pieces include pole piece gaps aligned with the second gaps between the magnet sections.

14. The electric motor of claim 13, wherein the first gaps in the rotatable shunting ring are misalignable with the second gaps in the fixed permanent magnets and the pole piece gaps resulting in the weak magnetic field to allow the inductive motor startup and rotatable to a second position with the first gaps in the rotatable shunting ring aligned with the second gaps in the fixed permanent magnets and the pole piece gaps resulting in a strong magnetic field for efficient synchronous operation.

15. The electric motor of claim 1, wherein the rotation of the rotatable magnetic circuit element is damped by a viscous damping structure.

16. The electric motor of claim 15, wherein the viscous damping structure comprises paddles in a chamber filled with a viscous fluid.

17. The electric motor of claim 15, wherein the viscous damping structure comprises a viscous fluid in direct contact with the rotatable magnetic circuit element.

18. A reconfigurable brushless AC electric motor, starting in asynchronous mode and transitioning after startup to a more efficient synchronous mode, the motor comprising:
 a stator receiving an AC power signal and generating a rotating stator magnetic field;
 a motor shaft passing through the stator;
 a rotor residing on the motor shaft and rotating with the motor shaft, the rotor comprising:
  inductive elements comprising squirrel cage bars for cooperation with the rotating stator magnetic field providing the asynchronous mode of operation for motor startup;
  pole pieces of the rotor, the pole pieces made of a magnetically conducting non-permanently magnetizable material; and
  at least one rotatable permanent magnet residing inside the rotor and non-translating with respect to the rotor and having a magnet axis parallel with the motor shaft and in magnetic cooperation with the pole pieces and having a first position resulting in a misalignment of the permanent magnets with the pole pieces creating a radially collapsed magnetic field to allow the inductive motor startup and rotatable to a second position resulting in a alignment of the permanent magnets with the pole pieces creating a radially expanded magnetic field for cooperation with the rotating stator magnetic field for efficient synchronous operation.

19. The electric motor of claim 2, wherein the at least one moveable permanent magnet comprises a four pole rotatable permanent magnet.

20. The electric motor of claim 1, wherein the rotatable magnetic circuit element is translationally fixed with respect to the rotor.

21. The electric motor of claim 1, wherein the radially collapsing the magnetic field and radially expanding the magnetic filed is obtained without requiring translation of the magnetic circuit element.

* * * * *